Oct. 23, 1951  A. F. STONE ET AL  2,572,405
TURRET MOUNTED CHAIN SAW HOLDING CLAW
Filed May 25, 1948
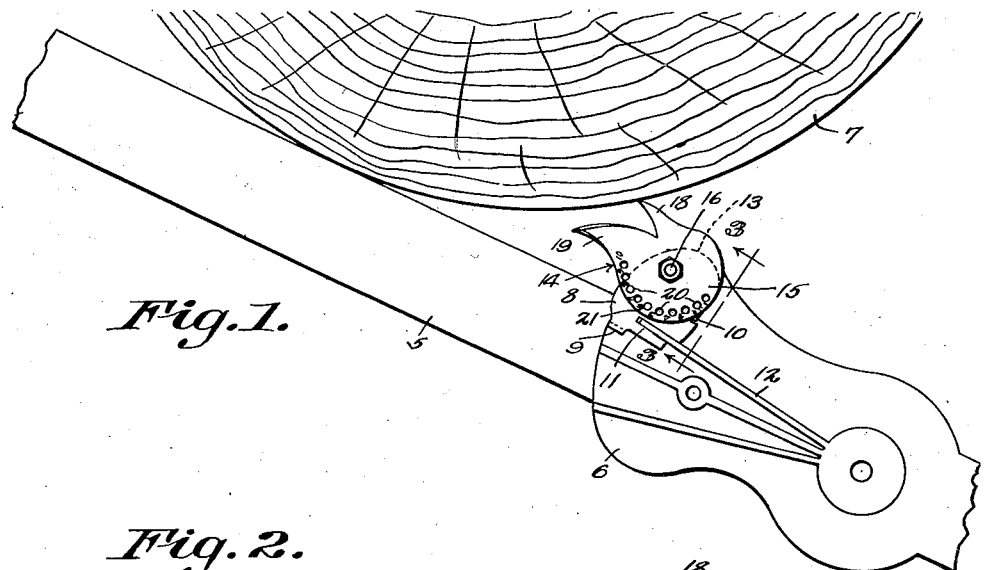
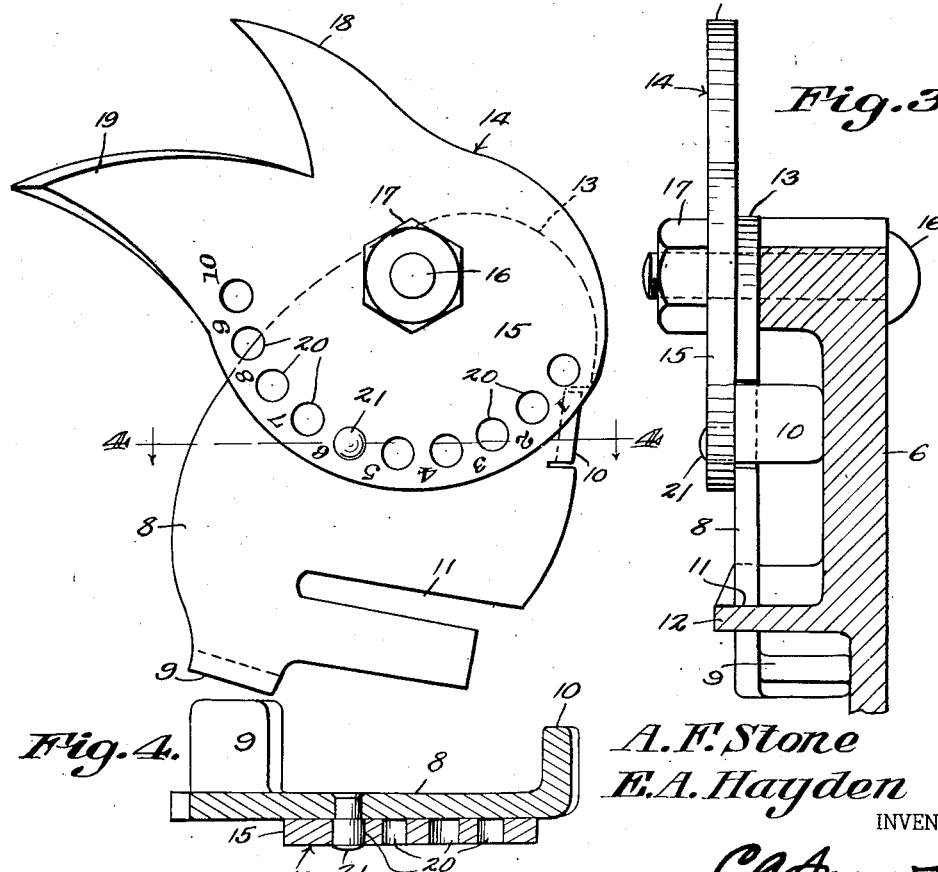
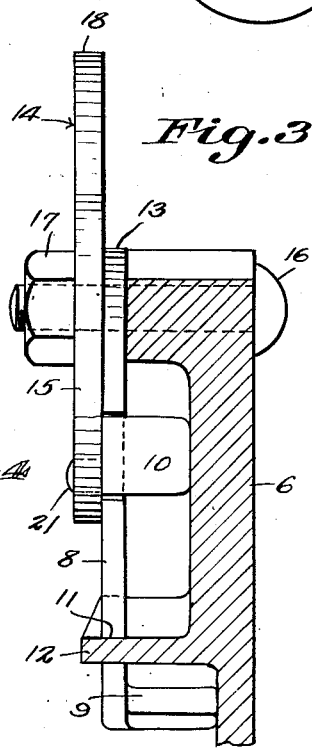
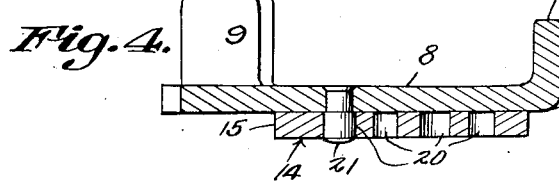
A. F. Stone
E. A. Hayden
INVENTORS
BY *CA Snow & Co.*
ATTORNEYS.

Patented Oct. 23, 1951

2,572,405

UNITED STATES PATENT OFFICE 2,572,405

TURRET-MOUNTED CHAIN-SAW HOLDING CLAW

Albert F. Stone and Ernest A. Hayden, Callahan, Calif.

Application May 25, 1948, Serial No. 29,106

3 Claims. (Cl. 143—157)

1

This invention relates to an improved holding claw attachment for chain-saws of the type used in such timber operations as felling, bucking, limbing, and the like. The present application is a continuation-in-part of our copending application filed June 19, 1947, Serial Number 755,778.

The main purpose of a holding claw attachment such as described in our copending application, and in the present application, is to relieve the saw operator of the necessity of combating, with his own weight and strength, the tendency of the machine to be pulled around the tree during the sawing operation. This tendency, which occurs as soon as the sawing operation is begun, is overcome by a small tooth on our claw that engages the tree when the saw begins to make a kerf. The claw is further constructed so that as the saw is swung into the tree, the longer tooth of the claw bites into the wood, coincident with disengagement of the shorter tooth.

In our copending application, a chain-saw holding claw is disclosed which is adapted for detachable connection to the bumper shoe of the saw, the claw when attached being held immovably relative to the bumper shoe. There is one fixed position for the claw, this position adapting the claw for felling operations, but not for such operations as bucking logs, limbing, etc.

The present invention covers a holding claw that is adjustably mounted relative to a base plate, the base plate being adapted for detachable fixed connection relative to the bumper shoe of the saw. The present invention, as will be made apparent, is thus adapted not only for tree felling operations, but also for the various other operations set forth above.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a top plan view of a portion of a conventional chain-saw having attached to it the claw of the present invention, the saw and claw being shown in a position assumed at the start of a tree felling operation.

Figure 2 is an enlarged top plan view of the claw alone.

Figure 3 is an enlarged section taken substantially on line 3—3 of Fig. 1.

Figure 4 is a section taken substantially on line 4—4 of Fig. 2.

Referring to the drawings in detail, the reference numeral 5 designates a conventional chain-saw bar, and 6 the bumper shoe, these parts constituting a conventional showing of portions of a chain saw, and being no part of the present invention. At the outset, it should be mentioned that there are various conventional designs of bumper shoes, and since the base plate (to be described) of our invention is intended to be secured to the bumper shoe, different base plate designs obviously would be required to permit the base plate to be fitted to bumper shoes of different designs. We are mainly interested in the provision of a base plate for the invention that can be firmly secured to a conventional bumper shoe, without requiring special design of the bumper shoe to accommodate the attachment that constitutes the invention.

A tree to be felled is designated 7, and referring to Fig. 1, it will be observed that the chain saw with the claw attachment secured to the bumper shoe thereof is in position to begin the felling operation.

The present invention includes a base plate 8 which is substantially flat, and which in the present instance is formed at one end with a tang 9, and along one side with a tang 10, these being disposed substantially perpendicularly to the plane of the base plate 8, to engage the surface of the particular bumper shoe 6 illustrated as an example of conventional bumper shoe construction.

Extended inwardly from one side of the base plate is a slot 11, that receives a reinforcing rib 12 of the illustrated bumper shoe.

At that end of the base plate 8 remote from the tang 9, the plate is curvingly formed as at 13 so as to be in substantial register with a correspondingly curved end of the bumper shoe.

A claw member pivotally mounted on the base plate 8 is generally designated 14, and is of flat material, including a body 15 the greatest part of which overlies the base plate 8.

Extended through registering openings formed in the bumper shoe 6, base plate 8, and claw member 14 respectively is a bolt 16, provided with a nut 17.

By reason of the engagement of tangs 9 and 10 with the bumper shoe surface, and the engagement of rib 12 in slot 11, it will be seen that the bolt 16 results in a fixed connection of the base plate 8 relative to the bumper shoe. This connection is of course detachable in the present instance.

While the bolt 16 serves as a means for holding the base plate 8 immovable relative to the bumper shoe, the bolt serves as a pivot pin for the claw member 14 so that rotatable adjustment of the claw member relative to the base plate and bumper shoe is permitted.

The claw member is not unlike the chain-saw holding claw illustrated and described in our copending application, and includes what may be termed a short tooth 18 and an adjacent long tooth 19. The exact arrangement of these teeth need not, it is believed, be dwelled upon extensively in the present application, since this has been previously covered in detail in our copending case. It is believed sufficient to state that assuming that the parts are positioned as in Fig. 1, when the saw begins to make a kerf in the wood, it will rotate clockwise on the bar 5, and this pulls the machine, not shown, of which the bumper shoe 6 is a part, to the left in Fig. 1 with tremendous force. Usually, the operator must pull back on the machine to resist this force, but using a claw as constructed in accordance with the invention, the tooth 18 will bite into the wood, relieving the operator of this fatiguing duty. As the saw swings into the tree, with the tree in effect serving as a fulcrum, in time the long tooth 19 bites into the wood, coincident with disengagement of the short tooth.

The claw member in the present instance is provided with a series of openings 20 disposed in a true arc around pivot 16, and respectively provided with suitable indicia such as numerical markings, as shown in Fig. 2. Preferably, there are approximately 10 openings, numbered correspondingly.

Extended from the face of the base plate 8 is a lug 21, which can be received in any selected opening 20.

To adjust the claw member, nut 17 is loosened, so that the claw member can be elevated and swung so that a particular opening 20 is positioned above lug 21. The lug 21 is permitted to enter into this opening, and the nut 17 is tightened, so that after the adjustment, the claw member, base plate, and bumper shoe are all relatively immovable. We have found, in this connection, that where lug 21 is positioned in openings numerically designated "1," "2," or "3," the claw member is properly positioned for limbing operations. Openings 4 through 6 would be used for felling, as illustrated in the drawings, openings 7 through 9 are used in bucking, and opening 10 is used for rendering the claw inoperative.

We believe there are a great number of ways in which the desired adjustments of the claw member relative to its base, and the securing of the parts in their adjusted positions, that could possibly be employed, and will be understood that the illustrated arrangement is one example of how this can be done.

What is claimed:

1. A holding claw attachment for a chain saw having a bumper shoe, comprising a base plate having a smooth flat top face, said base plate being proportioned to interlock separably with said bumper shoe; means extending from the bottom face of said base plate and spacing the base plate from and in parallelism with said bumper shoe; a bolt connecting the base plate and bumper shoe in said interlocked parallel relationship of the shoe and base plate; a claw member rotatably mounted upon said bolt and overlying the flat upper face of the base plate, said claw member rotatably adjustable over said upper face, said claw member including a generally rounded body and a pair of large holding teeth extending from and integral with a segment of the periphery of said body, said periphery being otherwise free of holding teeth and said teeth projecting a substantial distance beyond said periphery; and means inter-engaging said body and said base plate against relative movement in either direction from positions to which the claw member is rotatably adjusted upon the base plate.

2. A holding claw attachment for a chain saw having a bumper shoe, comprising a base plate having a smooth flat top face, said base plate being proportioned to interlock separably with said bumper shoe; means extending from the bottom face of said base plate and spacing the base plate from and in parallelism with said bumper shoe, a bolt connecting the base plate and bumper shoe in said interlocked parallel relationship of the shoe and base plate; a claw member rotatably mounted upon said bolt and overlying the flat upper face of the base plate, said claw member rotatably adjustable over said upper face, said claw member including a generally rounded body and a pair of large holding teeth extending from and integral with a segment of the periphery of said body, said periphery being otherwise free of holding teeth and said teeth projecting a substantial distance beyond said periphery, and means inter-engaging said body and said base plate against relative movement in either direction from positions to which the claw member is rotatably adjusted upon the base plate, said last-named means comprising a pin on the base plate and an arcuate row of openings on said body, said arcuate row extending substantially through approximately 180° of a circle the center of which is said pivot bolt.

3. A holding claw attachment for a chain saw having a bumper shoe formed with outstanding ribs, said attachment comprising a base plate having a smooth flat top face, said base plate having at least one inwardly extended slot receiving a rib of a bumper shoe for interlocking the base plate and bumper shoe; tangs extending inwardly from the bottom face of the base plate and engaging the bumper shoe for spacing the base plate from the bumper shoe and in parallelism with said bumper shoe, said base plate overlying the bumper shoe; a claw member overlying the base plate and including a flat body in face to face contact with the top face of the base plate and a pair of holding teeth integral with said body, said body being generally rounded and the holding teeth projecting a substantial distance beyond a substantially short segmental portion of the periphery of said body, said periphery being otherwise free of holding teeth; a bolt securing said base plate and bumper shoe, said body being rotatably mounted upon said bolt; means for rotatably adjusting said body to selected positions on the base plate, said positions extending through approximately 180° of a circle the center of which is said bolt; and means for fixedly securing said body to the base plate in any selected position to which the body is rotatably adjusted, said last-named means holding the body against rotation from said position in either direction.

ALBERT F. STONE.
ERNEST A. HAYDEN.

REFERENCES CITED

The following references are of record in the file of this patent:

UNITED STATES PATENTS

| Number | Name | Date |
|---|---|---|
| 814,886 | Swaggert | Mar. 13, 1906 |
| 993,838 | Kessler | May 30, 1911 |
| 1,562,732 | Arsneau | Nov. 24, 1925 |
| 1,723,125 | Bens | Aug. 6, 1929 |
| 1,769,122 | Doncaster | July 1, 1930 |
| 2,463,860 | Foster | Mar. 8, 1949 |